US009667545B2

(12) United States Patent
Xu et al.

(10) Patent No.: US 9,667,545 B2
(45) Date of Patent: May 30, 2017

(54) METHOD AND SYSTEM FOR AGGREGATE BANDWIDTH CONTROL

(75) Inventors: Ying Xu, Emeryville, CA (US);
Michelle Christine Munson, Berkeley, CA (US); Serban Simu, Oakland, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1578 days.

(21) Appl. No.: 11/849,782

(22) Filed: Sep. 4, 2007

(65) Prior Publication Data

US 2009/0063698 A1 Mar. 5, 2009

(51) Int. Cl.
*G06F 15/16* (2006.01)
*H04L 12/801* (2013.01)
*H04L 12/825* (2013.01)
*H04L 12/841* (2013.01)
*H04L 12/835* (2013.01)
*H04L 12/823* (2013.01)

(52) U.S. Cl.
CPC ............ *H04L 47/10* (2013.01); *H04L 47/11* (2013.01); *H04L 47/12* (2013.01); *H04L 47/25* (2013.01); *H04L 47/283* (2013.01); *H04L 47/30* (2013.01); *H04L 47/32* (2013.01)

(58) Field of Classification Search
CPC .................................................. H04L 47/10
USPC ...................................................... 709/233
See application file for complete search history.

(56) References Cited

U.S. PATENT DOCUMENTS

| 4,422,171 | A | 12/1983 | Wortley et al. |
| 5,001,628 | A | 3/1991 | Johnson et al. |
| 5,459,725 | A | 10/1995 | Bodner et al. |
| 5,805,920 | A | 9/1998 | Sprenkle et al. |
| 6,078,564 | A | 6/2000 | Lakshman et al. |
| 6,110,382 | A | 8/2000 | Wiemers et al. |
| 6,404,739 | B1 | 6/2002 | Gonno |
| 7,409,460 | B1 * | 8/2008 | Li ................................. 709/240 |
| 7,447,148 | B2 | 11/2008 | Gao et al. |
| 7,496,330 | B2 | 2/2009 | Toyoda et al. |
| 7,813,324 | B1 | 10/2010 | Goel et al. |
| 8,085,781 | B2 | 12/2011 | Munson et al. |

(Continued)

FOREIGN PATENT DOCUMENTS

| AU | 2008296894 B2 | 5/2013 |
| CN | 102201977 A | 9/2011 |

(Continued)

OTHER PUBLICATIONS

"International Application Serial No. PCT/US2008/010340, Search Report mailed Feb. 16, 2009".

(Continued)

*Primary Examiner* — Kevin Mai
(74) *Attorney, Agent, or Firm* — IBM End IPLaw

(57) ABSTRACT

A virtual link bandwidth control scheme is described that is a software-based mechanism for achieving distributed and coordinated bandwidth control. The scheme can be seamlessly integrated with the data transfer protocols utilizing queuing delay as part of rate control mechanism for data transfer and allows multiple processes to self-limit their transfer speeds, so that the aggregate rate stabilizes at a pre-configured level below the physical bottleneck capacity.

13 Claims, 3 Drawing Sheets

(56) References Cited

U.S. PATENT DOCUMENTS

| | | |
|---|---|---|
| 2002/0044528 A1 | 4/2002 | Pogrebinsky et al. |
| 2002/0114283 A1 | 8/2002 | Lee |
| 2003/0012212 A1 | 1/2003 | Earnshaw et al. |
| 2003/0032391 A1 | 2/2003 | Schweinhart et al. |
| 2003/0088690 A1 | 5/2003 | Zuckerman et al. |
| 2003/0223430 A1 | 12/2003 | Lodha et al. |
| 2003/0231661 A1 | 12/2003 | DePietro et al. |
| 2004/0179477 A1 | 9/2004 | Lincoln et al. |
| 2005/0018617 A1 | 1/2005 | Jin et al. |
| 2006/0159098 A1 | 7/2006 | Munson et al. |
| 2007/0081492 A1 | 4/2007 | Petrovic et al. |
| 2007/0268826 A1* | 11/2007 | Balakrishnan et al. ...... 370/230 |
| 2009/0006920 A1 | 1/2009 | Munson et al. |
| 2009/0075685 A1 | 3/2009 | Beyer, Jr. |
| 2010/0254392 A1 | 10/2010 | Katar et al. |
| 2011/0116435 A1 | 5/2011 | Liu et al. |
| 2012/0320732 A1 | 12/2012 | Simu et al. |

FOREIGN PATENT DOCUMENTS

| | | |
|---|---|---|
| WO | WO-2006/071866 A2 | 7/2006 |
| WO | WO-2006071866 A3 | 7/2006 |
| WO | WO-2009/032259 A1 | 3/2009 |

OTHER PUBLICATIONS

"International Application Serial No. PCT/US2008/010340, Written Opinion mailed Feb. 16, 2009".

Ansari, N, et al., "Local Stability of a new Adaptive Queue Management (AQM) Scheme", *IEEE Communications letters* vol. 8 (6), (Jun. 1, 2004).

Chengnian, L., et al., "An Adaptive Parameter Design for adaptive virtual queue management algorithm", (Nov. 16, 2004), 104-108.

Chiang, Mung, et al., "Layering as Optimization Decomposition: A mathematical theory of networks Architectures", *Proceedings of the IEEE* vol. 95(1), (Jan. 1, 2007), 255-312.

Chung, J., et al., "Aggregate Rate control for Efficient and Practical Congestion Management", *Technical Report QPI-CS-TR-04-03, CS Department*, (Feb. 2004).

Kunniyur, S. S, et al., "An Adaptive Virtual Queue (AVQ) Algorithm for Active Queue management", *IEEE/ACM Transactions on networking* vol. 12(2), (Apr. 1, 2004), 286-299.

Long, C., et al., "The Yellow active queue management algorithm", *Computer Networks* vol. 47(4), (Mar. 15, 2005), 525-550.

Mingyu, C., et al., "CAM04-2: A congestion control method jointly utilizing delay and Marking/Loss feedback", *Global TeleCommunications Conference*, 2006, (Nov. 1, 2006), 1-5.

Oruganti, S. S, et al., "A study of robust active queue management schemes for correlated traffic", *Computer Communications* vol. 28(1), (Jan. 31, 2005), 1-11.

Park, E. C, et al., "Analysis and design of the virtual rate control algorithm for stabilizing queues in TCP networks", *Computer Networks* vol. 44 (1), (Jan. 15, 2004), 17-41.

Sun, et al., "Raq: A robust active queue management scheme based on rate and queue Length", *Computer Communications, Elsevier Science Publishers BV* vol. 30(8), (Apr. 29, 2007), 1731-1741.

Xia, Y., et al., "Accumulation-Based Congestion Control", *IEEE / ACM Transactions on Networking* vol. 13(1), (Feb. 1, 2005), 69-80.

"Australian Application Serial No. 2008296894. Voluntary Amendment dated Mar. 19, 2010", 9 pgs.

"European Application Serial No. 08795746.0, Response filed Feb. 4, 2011 to Office Action mailed Aug. 2, 2010", 15 pgs.

"European Application Serial No. 08795746.0, Office Action mailed Aug. 2, 2010", 11Pgs.

Chen, Mingyu, et al., "CAM04-2: A Congestion Control Method Jointly Utilizing Delay and Marking/Loss Feedback", IEEE Global Telecommunications Conference, 2006. GLOBECOM '06, XP031075027, (2006), 1-5.

Chiang, Mung, et al., "Layering as Optimization Decomposition: A Mathematical Theory of Network Architectures", Proceedings of the IEEE, 95(1), XP011172471; ISSN: 0018-9219, (2007), 255-312.

Chung, J., et al., "Aggregate Rate Control for Efficient and Practical Congestion Management", Technical Report QPI-CSTR-04-03, CS Department, [Online], XP002511936; Worcester Polytechnic Institute; Retrieved from the Internet URL:ftp://ftp.cs.wpi.edu/pub/techreports/04-03.ps.gz [retrieved on Jan. 20, 2008], (2004), 14 pgs.

Kunniyur, S. S, et al., "An adaptive virtual queue (AVQ) algorithm for active queue management", IEEE/ACM Transactions on Networking, 12(2), XP0011932901SSN: 1063-6692, (2004), 286-299.

Long, Chengnian, et al., "An adaptive parameter design for adaptive virtual queue management algorithm", 12th IEEE International Conference on Networks, 2004. (ICON 2004). Proceedings, vol. 1, XP010777514, ISBN:978-0-7803-8783-6, (2004), 104-108.

Long, Chengnian, et al., "The Yellow active queue management algorithm", Computer Networks, 47(4), XP002511970; ISSN: 1389-1286, (Mar. 15, 2005), 252-550.

Oruganti, S. S, et al., "A study of robust active queue management schemes for correlated traffic", Computer Communications, 28(1), XP004724688; ISSN:0140-3664, (Jan. 31, 2005), 1-11.

Park, Eun-Chan, et al., "Analysis and design of the virtual rate control algorithm for stabilizing queues in TCP networks", Computer Networks, 44(1), XP004472999; ISSN: 1389-1286, (Jan. 15, 2004), 17-41.

Sun, J., et al., "RaQ: A robust active queue management scheme based on rate and queue length", Computer Communications, 30(8), XP022053064; ISSN: 0140-3664, (Jun. 8, 2007), 1731-1741.

Xia, Y., et al., "Accumulation-based congestion control", IEEE/ACM Transactions on Networking, 13(1), XP001228196; ISSN:1063-6692, (2005), 69-80.

Xu, K., et al., "TCP Unfairness in ad hoc wireless networks and a neighborhood RED solution", Wireless Networks, 11(4), (Jul. 2005), 383-399.

Zhu, Li, et al., "Local stability of a new adaptive queue management (AQM) scheme", IEEE Communications Letters, 8(6), XP011113960; ISSN: 1089-7798, (2004), 406-408.

"Australian Application Serial No. 2008296894, Office Action mailed Nov. 10, 2011", 3 pgs.

"Chinese Application Serial No. 200880105499.5, First Office Action mailed Oct. 31, 2011", (w/ English Translation), 10 pgs.

Japanese Application Serial No. 2010-524022, Response filed Dec. 20, 2011 to Office Action mailed Oct. 4, 2011, (w/ English Translation of Amended Claims), 10 pgs.

"Japanese Application Serial No. 2010-524022, Office Action mailed Jan. 17, 2012", (w/ English Translation), 4 pgs.

"Japanese Application Serial No. 2010-524022, Office Action mailed Oct. 4, 2011", (w/English Translation), 4 pgs.

"European Application Serial No. 08795746.0, Office Action mailed Aug. 12, 2011", 7 pgs.

"Advanced Network Management Lab—Tsunami", http://anml.iu.edu/research.shtml?prim=lab_researc, (2005).

"U.S. Appl. No. 11/317,663, Final Office Action mailed Mar. 4, 2011", 18 pgs.

"U.S. Appl. No. 11/317,663, Response filed Jan. 28, 2009 to Non Final Office Action mailed Oct. 28, 2008", 14 pgs.

"U.S. Appl. No. 11/317,663, Advisory Action mailed Jun. 22, 2009", 3 pgs.

"U.S. Appl. No. 11/317,663, Examiner Interview Summary mailed May 25, 2010", 3 pgs.

"U.S. Appl. No. 11/317,663, Final Office Action mailed Mar. 16, 2010", 23 pgs.

"U.S. Appl. No. 11/317,663, Final Office Action mailed Apr. 13, 2009", 19 pgs.

"U.S. Appl. No. 11/317,663, Non Final Office Action mailed Sep. 2, 2010", 16 pgs.

"U.S. Appl. No. 11/317,663, Non Final Office Action mailed Sep. 4, 2009", 22 Pgs.

"U.S. Appl. No. 11/317,663, Non Final Office Action mailed Oct. 28, 2008". OARN, 16 pgs.

"U.S. Appl. No. 11/317,663, Notice of Allowance mailed Aug. 1, 2011", 10 pgs.

(56) References Cited

OTHER PUBLICATIONS

"U.S. Appl. No. 11/317,663, Pre-Apeeal Brief Request for Review mailed Jul. 5, 2011", 5 pgs.
"U.S. Appl. No. 11/317,663, Response filed Jan. 4, 2010 to Non Final Office Action mailed Sep. 4, 2009", 15 pgs.
"U.S. Appl. No. 11/317,663, Response filed Feb. 2, 2011 to Non Final Office Action mailed Sep. 2, 2010", 15 pgs.
"U.S. Appl. No. 11/317,663, Response filed Jun. 15, 2009 to Final Office Action mailed Apr. 13, 2009", 14 pgs.
"U.S. Appl. No. 11/317,663, Response filed Jul. 16, 2010 to Final Office Action mailed Mar. 16, 2010", 13 pgs.
"U.S. Appl. No. 11/768,336, Non Final Office Action mailed Oct. 14, 2011", 7 pgs.
"Aspera Technology: "The Aspera FASP Solution"", www.asperasoft.com/technology-fasp.htm, (May 1, 2004), 1-4.
"Australian Application No. 2008296894, Response Filed Nov. 12, 2012", 15 pgs.
"Australian Application Serial No. 2008296894, Subsequent Examiners Report mailed Dec. 6, 2012", 3 pgs.
"Australian Application Serial No. 2005322044, Examiner Report mailed Oct. 13, 2009", 2 pgs.
"Australian Application Serial No. 2005322044, Response filed Oct. 13, 2010 to Examination Report mailed Oct. 13, 2009", 23 pgs.
"Australian Application Serial No. 2005322044, Subsequent Examiner Report mailed Nov. 22, 2010", 2 pgs.
"Australian Application Serial No. 2008296894, Response filed Mar. 8, 2013 to Examination Report mailed Dec. 6, 2012", 15 pgs.
"Canadian Application Serial No. 2,698,339, Office Action mailed Jan. 29, 2014", 3 pgs.
"Canadian Application Serial No. 2,698,339, Office Action mailed Sep. 4, 2012", 2 pgs.
"Chinese Application Serial No. 200580044742.3, Response filed May 26, 2010 to Office Action Mailed Dec. 11, 2009", (w/ English Translation of Amended Claims), 21 pgs.
"Chinese Application Serial No. 200580044742.3,Office Action mailed Dec. 11, 2009", 5 pgs.
"Chinese Application Serial No. 200880105499.5, Office Action mailed Sep. 13, 2012", With English Translation, 6 pgs.
"Chinese Application Serial No. 200880105499.5, Response filed Nov. 2, 2012 to Office Action mailed Sep. 13, 2012", No claims amended. Response addressed a typo (sm), 5 pgs.
"Chinese Application Serial No. 200880105494995, Response filed May 15, 2012 to Office Action mailed May 15, 2012", 12 pgs.
"Chinese Application Serial No. 2010-524022, Office Action Response Filed Apr. 13, 2012", Japanese Translation Only, 5 Pgs.
"European Application No. 08795746.0, Non Final Office Action dated Jul. 30, 2012", 9.
"European Application Serial No. 05855603.6, Communication dated Feb. 27, 2008", 5 pgs.
"European Application Serial No. 05855603.6, Office Action mailed May 4, 2009", 9 pgs.
"European Application Serial No. 05855603.6, Response filed Jun. 4, 2009 to Communication mailed May 4, 2009", 3 pgs.
"European Application Serial No. 05855603.6, Response filed Sep. 5, 2008 to Communication dated Feb. 27, 2008", 24 pgs.
"European Application Serial No. 08795746.0, Examination Notification Art. 94(3) mailed Jul. 12, 2013", 3 pgs.
"European Application Serial No. 08795746.0, Response filed Feb. 4, 2013 to Examination Notification Art. 94(3) mailed Jul. 30, 2012", 13 pgs.
"European Application Serial No. 08795746.0, Response filed Feb. 21, 2012 to Office Action mailed Aug. 12, 2011", 16 pgs.
"European Application Serial No. 09175853.2 Office Action Mailed Dec. 22, 2009", 5 pgs.
"European Application Serial No. 09175853.2, Office Action mailed Jul. 29, 2010", 1 pg.
"HyperIP", http://www.netex.com/products/hyperip.html, (2006).
"International Application Serial No. PCT/US2005/047076, International Search Report and Written Opinion mailed Jul. 28, 2006", 22 Pages.
"Invitation to Pay Additional Fees for Application No. PCT/US2005/047076, date mailed May 22, 2006", 5 Pages.
"Japanese Application Serial No. 2007-548581, Decision to Grant mailed Aug. 10, 2010", (w/ English Translation), 6 pgs.
"Orbital Data 5500 product", Product Data Sheet, http://www.orbitaldata.com/pdf/Orbital_5500.pdf#search=%22Orbital%20Data%205500%20%22, (2004), 2 pages.
"The Aspera FASP Solution", Aspera Technology, URL, http://web.archive.org/web/20041015013735/www.asperasoft.com/technology_fasp.html, (Oct. 15, 2004), 1-4.
Byers, J. W., et al., "A digital fountain approach to reliable distribution of bulk data", ACM SIGCOMM Computer Communication Review, 28(4), (1998), 56-67.
Chandrayana, Kartikeya, "Novel Placement of Congestion Control Functions in the Internet", [Online]. Retrieved Dec. 5, 2012 from the Internet: <http://www.artwustl.edu/~gorinsky/cited/RISM_Chandrayana_Dissertaion_2004>, (2004), 201 pgs.
Clark, D. D., et al., "NETBLT: A Bulk data transfer protocol", Network Working Group Request for Comments, RFC 998, (Mar. 1987), 21 pages.
Dunigan, Tom, "Faster Bulk Transfer Starring UDP", http://www.csm.ornl.gov/~dunigan/net100/udp/, (Sep. 2003).
Floyd, Sally, et al., "Equation-based congestion control for unicast applications", Proc. ACM SIGCOMM, (Sep. 2000), 43-56.
Floyd, Sally, "HighSpeed TCP for Large Congestion Windows", RFC 3649, Experimental, http://www.icir.org/floyd/hstcp.html, (Dec. 2003), 25 pages.
Grieco, Luigi A., et al., "Performance evaluation and comparison of Westwood+, New Reno, and Vegas TCP congestion control", ACM SIGCOMM Computer Communication Review, 34(2), (2004), 25-38.
Gu, Y., et al., "Experiences in Design and Implementation of a High Performance Transport Protocol", Proceedings of the 2004 ACM/IEEE conference on Supercomputing, (2004), 14 pages.
Gu. Y., et al., "UDT:A transport protocol for Data intensive applications", Internet Engineering Task Force, Internet Draft, IETF Standard-Working-Draf, (Aug. 2004).
Handley, S. F. et al., "Friendly rate control (TFRC):protocol specifications", [Online]. Retrieved from the Internet: <URL: http://citeseer.ist.psu.edu/handley03tcp.html>, (2001).
He, E., et al., "Reliable Blast UDP: Predictable High Performance Bulk Data Transfer", Proceedings of the IEEE International Conference on Cluster Computing., (Sep. 23-26, 2002), 317-324.
Jacobson, V., et al., "Congestion Avoidance and Control", In: Proceedings of the Sigcomm '88 Symposium, (Nov. 1988), 1-25.
Jin, Cheng, et al., "FAST TCP", 57th IETF Meeting, Transport Area WG, Vienna, Austria, Available from http://netlab.caltech.edu/FAST/, (Jul. 18, 2003), 73 pages.
Jin, Cheng, et al., "FAST TCP for high-speed long-distance networks", http://netlab.caltech.edu/pub/papers/draft-jwl-tcp-fast-01.txt, (Jun. 30, 2003), 8 pages.
Jin, Cheng, et al., "FAST TCP: Motivation, Architecture, Algorithms, Performance", Presentation for Infocom 2004, available at http://netlab.caltech.edu/FAST/, (2004), 31.
Jin, Cheng, et al., "FAST TCP: Motivation, Architecture, Algorithms, Performance", Proceedings of IEEE INFOCOM, (Mar. 2004), 12 pgs.
Jin, Cheng, et al., "FAST TCP: Motivation, Architecture, Algorithms, Performance", Caltech CS Technical Report, available at http://netlab.caltech.edu/FAST/, (Aug. 2, 2004), 44 pages.
Kelly, T., "Scalable TCP: improving performance in highspeed wide area networks", ACM SIGCOMM Computer Communication Review, 33(2), (2003), 83-91.
Lakshman, T. V., et al., "The performance of TCP/IP for networks with high bandwidth-delay products and random loss", IEEE/ACM Transactions on Networking, 5(3), (Jun. 1997), 336-350.
Liebeherr, J., et al., "A Protocol for Relative Quality-of-Service in TCP/IP-based Internetworks", Proceedings of 3rd IEEE Workshop on the Architecture and Implementation of High Performance Communication Subsystems (HPCS'95), (Aug. 23, 1995), 62-65.
Mathis, M., et al., "The macroscopic behavior of the TCP congestion avoidance algorithm", ACM SIGCOMM Computer Communication Review, 27(3), (1997), 67-82.

(56) References Cited

OTHER PUBLICATIONS

Maymounkov, P., et al., "Rateless Codes and Big Downloads", Proc. of the 2nd International Workshop on Peer-to-Peer Syst, (2003), 6 pages.

Meiss, M. R, "Tsunami: A High-Speed Rate-Controlled Protocol for File Transfer", http://steinbeck.ucs.indiana.edu/~mmeiss/papers/tsunami.pdf, (2003), 1-10.

Postel, J., et al., "File Transfer Protocol (FTP)", IETF RFC 959, (Oct. 1985), 69 pgs.

Wu, R. X. et al., "GTP: Group transport Protocol for lambda-grids", IEEE Symposium on Cluster Computing and the Grid (CCGrid), (Apr. 19, 2004), 228-238.

Xu, L., et al., "Binary Increase Congestion Control (BIC) for Fast Long-Distance Networks", Proceedings of IEEE INFOCOM, (2004), 11 pgs.

Yunhong, G., "A Transport Protocol for Data Intensive Applications draft", IETF Standard-Working-Draft, Internet Engineering Task Force, (2004).

U.S. Appl. No. 13/442,707, filed Apr. 9, 2012, Multicast Bulk Transfer System.

"U.S. Appl. No. 13/442,707, Non Final Office Action mailed Aug. 1, 2014", 8 pgs.

\* cited by examiner

METHOD AND SYSTEM FOR AGGREGATE BANDWIDTH CONTROL

BACKGROUND

There are many situations in which it may be desired to limit the amount of bandwidth utilized by a specific group of processes transferring data over a network. For example, it is often of interest to limit the bandwidth usage of certain user processes traversing one or more segments inside a network in order to reserve network resources for other user processes sharing the same set of network segments. It may also be desired to bound the aggregate bandwidth of a group of processes between a specific set of servers and clients, so that the residue bandwidth resources in front of the servers may be used by other user processes connected with the same set of servers. In what follows, a virtual link control system is presented to realize the functionality of the aforementioned aggregate bandwidth control.

DETAILED DESCRIPTION

Figure 1:
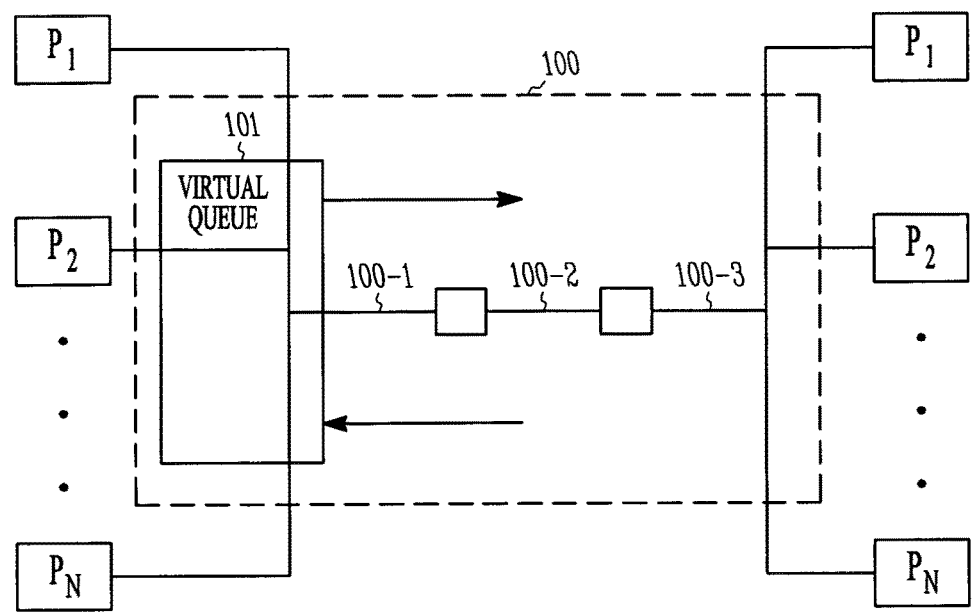
FIG. 1 is a diagram showing multiple processes utilizing a common network pathway in which a virtual link has been inserted.

Described herein is a method and system by which a group of independently executing processes residing in the same or different computers may limit the aggregate amount of bandwidth that they use in transferring data over a network, wherein these processes may consist of a set of data transfers traversing either one or more common segments inside the network, or all segments along a particular network pathway. Such bandwidth limiting may be used, for example, to ensure some residual capacity along the shared network segments for use by other processes that also traverse through those segments. In order to provide aggregate bandwidth control, a virtual link is implemented by a virtual link controller integrated into each process. The virtual link controllers communicate with one another either over a network or within a computer. The virtual link is a software construct that emulates a physical link with some throughput capacity. The throughput capacity may thus be specified as some value $c_l$ representing the desired maximum bandwidth to be utilized by the group of processes. FIG. 1 illustrates an exemplary configuration of N processes $P_1$ through $P_N$ that transfer data over a network 100 (the dashed line box), and traverse common network segments 100-1, 100-2 and 100-3. A virtual link 101 is shown as being interposed within the network 100 that emulates a physical link with limited capacity. The shared segments 100-1, 100-2 and 100-3 may be, for example, shared by the processes $P_1$ through $P_N$ as well as other processes, and it may be desired to reserve some residual bandwidth along these segments for use by those other processes.

In order to implement the virtual link, the virtual link controller of each process communicates with each other to determine the total amount of data traffic flowing to or from the group of processes over the virtual link. The virtual link controller may determine the traffic passing through the virtual link from intermittent broadcasts by each process that signal to each other process the amount of data transferred by it. Such broadcasts may, for example, contain the amount of data transferred over some period of time or may signify that some specified amount of data has been transferred. In order to determine the amount of traffic passing by quickly and accurately, virtual link controllers may be deployed in locations close to each other, so that a broadcast message sent by a particular virtual link controller may be heard by all controllers soon after its disposal. In the simplistic case, for example, virtual link controllers, as well as their hosting processes, may be deployed on a single computer and jointly realize a virtual link. In another configuration, these processes may be deployed on distinct nodes across a connected network as, for example, a group of computer nodes on a common local area network, or a set of server nodes integrated together through a common network backplane.

The virtual link controller uses the collected traffic information to update a virtual queue that simulates the queueing maintained by the buffer in a physical link with limited bandwidth. No data is actually queued, however, as the virtual queue is merely a number representing the amount of data that would be queued in a physical link. Whenever the traffic over the virtual link exceeds the link capacity $c_l$, the virtual queue is filled with data at a rate equal to the difference, similar to the way an actual queue in the buffer of a physical link would be filled. Conversely, when the traffic is below the link capacity, the virtual queue is emptied at a rate equal to the difference between the link capacity and the overall traffic flow rate until no more data is left in the virtual queue. When the system stabilizes, the amount of data inside the virtual queue shall stay at some fixed level below the maximal virtual queue size $Q_{max}$, indicating that the overall data traffic rate equals the virtual link capacity $c_l$. The amount of data in the virtual queue is thus an indication of the extent to which the traffic flow over the virtual link over-utilizes or under-utilizes the desired bandwidth limit $c_l$ and may be used as a feedback signal by a rate control mechanism incorporated into each process to regulate its data transfer rate. The rate control mechanism may control the rate at which the process transfers data based upon one or more virtual queue parameters, such as the absolute amount of data in the virtual queue $Q(t)$, the corresponding virtual queuing delay $q(t)$ (where $q(t)=Q(t)/c_l$), and/or the relative occupancy of the virtual queue $Q(t)/Q_{max}$, which indicates how close the amount of virtual queueing is to the maximal virtual queue size $Q_{max}$.

Figure 2:
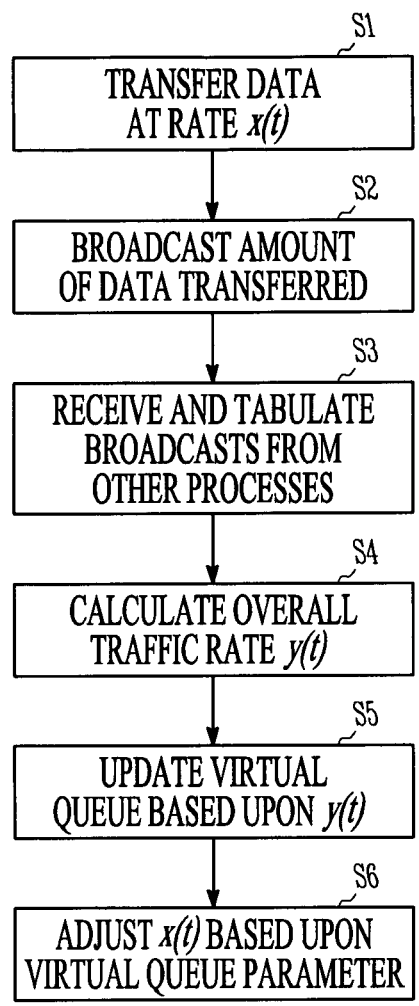
FIG. 2 illustrates an exemplary implementation of a virtual link controller and rate control mechanism.

An example of a virtual link controller and rate control mechanism as implemented by the execution of sequential steps within a process is illustrated in FIG. 2. At step S1, the process transfers data at a prescribed rate $x(t)$. At step S2, the process broadcasts to other processes of the group an indication of the amount of data that has been transferred by it. At step S3, similar broadcasts from other processes are received and tabulated so that the overall traffic rate $y(t)$ over the virtual link can be calculated at step S4. Based upon the overall traffic rate, the amount of data in the virtual queue is updated at step S5. At step S6, the prescribed data transfer rate $x(t)$ is adjusted in accordance with a parameter reflective of the amount of virtual queuing, such as the virtual queuing delay itself, the amount of data in the virtual queue, and/or a parameter reflective of the relative occupancy of the virtual queue, such as the ratio of the amount of data in the virtual queue to the maximal virtual queue size. The process then returns to step S1 to continue transferring data at the rate $x(t)$.

The virtual link bandwidth control scheme as described above may be implemented in processes utilizing any data transfer protocol that permits adjustment of its overall data transfer rate based on some form of queueing delay information. An example of a protocol that is particularly suitable for implementation of the virtual link control scheme is the FASP protocol as described in U.S. patent application Ser. No. 11/317,663, filed on Dec. 23, 2005 and hereby incorporated by reference. The FASP protocol derives an actual queuing delay from measured round trip times for data packets. This derived delay represents the total amount of queueing delay generated at all physical links along the network path through which FASP sends data packets, and is used as an input parameter by the rate control mechanism in FASP for adjusting the data transfer rate. The protocol increases the data transfer rate with decreasing queuing delay and vice-versa. By basing adjustment of the data transfer rate on queuing delay rather than packet timeouts, the FASP protocol is, for example, able to more efficiently utilize networks where loss of data may frequently occur. In order to implement the virtual link bandwidth control scheme, the rate control mechanism of the FASP protocol may be modified to use the virtual queuing delay provided by the virtual link controller or a combination of an actual measured queuing delay and the virtual queuing delay.

Figure 3:
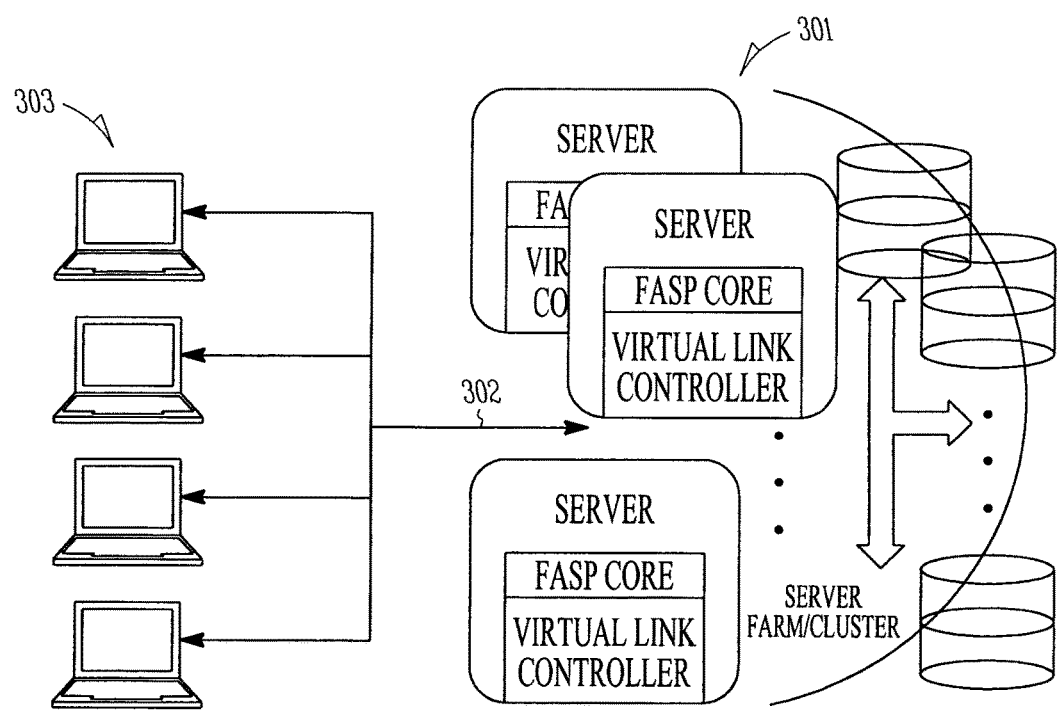
FIG. 3 illustrates an exemplary server configuration for utilizing the virtual bandwidth control scheme.

Virtual link control and FASP may jointly form an end-to-end, application-layer bandwidth control solution with superior configurability. The bandwidth caps enforced by virtual link control are bi-directional, and can be adjusted on-the-fly, either through configuration files or through commands from other software modules. Each FASP session maintains its own virtual link controller and computes its rate independently. By eliminating centralized point of control, the virtual link design avoids single point of failure, and embeds distributed control into application protocols. This distinguishes the virtual link bandwidth control scheme from other forms of active queue management (AQM) schemes, which are often implemented at centralized strategic points, e.g., inside network routers. FIG. 3 shows an example of a group of servers 301 executing processes that communicate with a group of clients 303 over a common network pathway 302. Each server process maintains its own FASP session as well as virtual link controller. Each virtual link controller constantly manages its internal virtual queue, which provides necessary delay information for the corresponding FASP session to perform dynamic rate updates. In spite of independent rate update activities, FASP sessions sharing a common virtual link are able to jointly enforce a pre-defined bandwidth cap via exchanging incoming/outgoing traffic information.

In addition to FASP, any rate control mechanism that adjusts the rate of its process based on some form of queueing delay information may be combined with the virtual link control scheme to realize aggregate bandwidth capping. Instead of solely relying on the queueing delay information that it is already aware of, a rate control mechanism may also use a combination of that queueing delay and the virtual queueing delay to adjust the transfer rate of its hosting process. In one embodiment, a rate control mechanism of an individual process adjusts its data transfer rate based on a combination of the virtual queueing delay and the queueing delay derived from the round trip delay measurements collected by its process. For instance, the data transfer rate $x(t)$ may be updated at the end of a period T as:

$$x(t+T)=x(t)+K[\alpha-x(t)(q(t)+q_f(t))]$$

where $q(t)$ is the amount of virtual queueing delay informed by the virtual link controller, $q_f(t)$ is the amount of queueing delay measured by the rate control mechanism, K is some constant, and $\alpha$ is the setpoint for $x(t)(q(t)+q_f(t))$. In this case, $x(t)q(t)$ captures the amount of queueing present in the virtual queue, and $x(t)q_f(t)$ represents the amount of queueing in the queues maintained by physical links along the network path the process travels through. Their sum $x(t)(q(t)+q_f(t))$, is the total amount of data accumulated at all the queues (both physical and virtual) that are accessed by the process. By comparing this amount of data with the setpoint $\alpha$, the rate control mechanism adjusts the transfer rate in the next period $x(t+T)$ up and down. In particular, if $x(t)$ exceeds the capacity of a particular link, be it the virtual link or one of the physical links, the queueing delay at that link will grow and drive up the total amount of queueing delay $(q(t)+q_f(t))$. Once $(q(t)+q_f(t))$ becomes so large that its product with $x(t)$ surpasses the setpoint $\alpha$, the rate control mechanism will force the process to reduce its transfer rate as a measure to avoid further congesting the link.

The capacity of the virtual link $c_l$ may be chosen to be a value that is smaller than the link capacities of the shared network segments, in order to reserve bandwidth on those segments for others users. In this scenario, the aggregate transfer rate will be bounded by the virtual link capacity, and therefore no queueing will accumulate at the physical links within those shared network segments. A rate control mechanism may thus only respond to the virtual queueing delay in this context. In one embodiment, a rate control mechanism of an individual process adjusts its data transfer rate in a manner that attempts to maintain the amount of data injected into the virtual queue at a constant level. For example, the data transfer rate $x(t)$ may be updated at a period T as:

$$x(t+T)=x(t)+K[\alpha-x(t)q(t)]$$

where $q(t)$ is the virtual queuing delay so that $x(t)q(t)$ is the amount of data injected into the virtual queue by the process, K is some constant, and $\alpha$ is the setpoint for $x(t)q(t)$. In this embodiment, the rate at which each process transfers data increases or decreases as the virtual queuing delay decreases or increases, respectively. The setpoint $\alpha$ and maximum size $Q_{max}$ of the virtual queue are selected such that, when all of the processes in the group are transferring data at their maximal rates, the virtual queue is occupied between 0 and $Q_{max}$, with each process injecting an equal amount of data into it. As the data transfer rate of certain processes decreases, the virtual queuing delay decreases to allow other processes to increase their data transfer rates in order to maintain their individual queue injection amounts constant.

In another embodiment, the queue injection setpoint $\alpha$ is dynamically adjusted in accordance with the amount of data present in the virtual queue so that the setpoint is increased as the virtual queue is emptied and vice-versa. As explained below in greater detail, such dynamic tuning of the queue injection setpoint may also result in improved equilibrium and stability properties for the virtual link. The queue injection setpoint $\alpha$ may be adjusted on the basis of the current amount of virtual queueing $Q(t)$ and the maximal virtual queue size $Q_{max}$, via a setpoint adjustment function $f(Q(t), Q_{max})$. In one embodiment, the setpoint adjustment function is simply a function of the relative occupancy $Q(t)/Q_{max}$ itself. In particular, it may be defined as a non-increasing function of $Q(t)/Q_{max}$, ranging from 1 to 0 as $Q(t)/Q_{max}$ increases from 0 till it passing over 1. An example of such a function is $f(Q(t), Q_{max})=[(1-Q(t)/Q_{max})^+]^k$, where k is some positive number and "+" maps any negative number to zero. The rate control mechanism then adjusts the data transfer rate $x(t)$ of each process at a period T as:

$$x(t+T)=x(t)+K(f(Q(t), Q_{max})\alpha-x(t)q(t))$$

By appropriate specification of the queue injection setpoint α and the setpoint adjustment function $f(Q(t), Q_{max})$, a single process will utilize nearly all of the bandwidth of the virtual link if no other processes are transferring data and will aggressively reduce its bandwidth utilization as the number of other processes transferring data increases. Particularly, at the equilibrium moment when the system stabilizes, the amount of data an individual process injects into the queue $x(t)q(t)$ exactly matches the target queue set point $f(Q(t), Q_{max})α$, so that the rate control mechanism always computes a new rate $x(t+T)$ that is equal to the old rate $x(t)$. This can be reflected by the following equation which governs the relationship between the transfer rate of a process $x^*$, the virtual queueing delay it experiences $q^*$, and the queue target set point $f(Q^*, Q_{max})α$, in an equilibrium state:

$$x^*q^* = f(Q^*, Q_{max})α$$

Since each process in the group will experience the same amount of virtual queueing delay $q^*$ at equilibrium, by assigning the same a to all processes in the group, each individual process will have the same target queue set point and consequently attain the same transfer rate in a stabilized system. As the number of processes in the group N increases, each process will acquire an equal (or fair) share of the total virtual link capacity $c_l$, which is $c_l/N$.

From another perspective, by properly selecting the setpoint adjustment function $f(Q(t), Q_{max})$ as a non-increasing function of $Q(t)$, the amount of virtual queueing $Q^*$ in a stabilized virtual queue increases as the total number of processes increases, so that a decreasing target queue set point $f(Q^*, Q_{max})α$ is provided to each process in a way that matches the decreasing pace of its transfer rate $x^*$. Despite its increasing trend, the amount of total virtual queueing (delay) may still be bounded below a finite value related to the maximal virtual queue size $Q_{max}$, no matter how many processes are present in the group. For example, when $f(Q(t), Q_{max}) = [(1-Q(t)/Q_{max})^+]^k$, the amount of data in the virtual queue in equilibrium $Q^*$ increases with N towards $Q_{max}$, in order to match the decreasing transfer rate of an individual process, that is, $c_l/N$. However, $Q^*$ will only gradually approach to $Q_{max}$ but will not pass $Q_{max}$ since the transfer rate is always greater than zero, no matter how large N may become. Bounding the total amount of virtual queueing below $Q_{max}$ reduces the likely oscillation range of the virtual queueing delay in a system where the number of processes N varies over time. As mentioned before, the transfer rate of a process changes up and down according to the amount of virtual queueing delay, by virtue of the rate control mechanism. Hence, reducing the oscillation range of the virtual queueing delay also helps to smooth out the transfer rates of individual processes in dynamic settings.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A system implemented as a group of software processes independently executed by one or more computers, wherein the group of independently executing software processes are configured to transfer data across one or more network segments in accordance with a specified protocol, the system comprising:

a bandwidth limiting mechanism to limit an amount of bandwidth used by the group of software processes to transfer the data across the one or more network segments, thereby leaving an amount of residue bandwidth for use by one or more other software processes to transfer other data across the one or more network segments, the one or more other software processes not included in the group of software processes, the bandwidth limiting mechanism comprising:

a respective virtual link controller incorporated into each of the software processes of the group independently executed by the one or more computers, the respective virtual link controllers being configured to determine an aggregate traffic rate of the data transferred by the group of software processes over the one or more network segments and implement a virtual link through which the software processes of the group are to be regarded as transferring their data;

wherein the virtual link is a software construct that emulates a physical link with a throughput capacity specified as a value $c_l$ representing a desired maximum bandwidth to be utilized by the group of software processes;

wherein the virtual link includes a virtual queue that is filled or emptied in accordance with whether the aggregate traffic rate is greater than or less than, respectively, the specified throughput capacity $c_l$, the virtual queue being a number representing an amount of data that would be queued in the physical link emulated by the virtual link;

wherein the virtual link controllers are configured to determine the aggregate traffic rate of data that is regarded to be passing through the virtual link from intermittent broadcasts sent by each respective one of the software processes of the group that signal to each other of the software processes of the group the amount of data transferred by the each respective one of the software processes of the group; and, a respective rate control mechanism incorporated into each of the software processes of the group that is configured to regulate a respective data transfer rate $x(t)$ of each of the software processes of the group based upon one or more virtual queue parameters reflective of an extent to which the virtual queue is filled with data; and, wherein:

the respective rate control mechanism of each of the software processes of the group is configured to adjust the respective data transfer rate of each of the software processes of the group utilizing a setpoint;

the setpoint is dynamically adjusted in accordance with the amount of data in the virtual queue so that the setpoint is increased as the amount of data in the virtual queue decreases and is decreased as the amount of data in the virtual queue increases;

the one or more virtual queue parameters include a virtual queuing delay $q(t)$ calculated as $q(t) = Q(t)/c_l$, where $Q(t)$ is the amount of data present in the virtual queue; and the respective rate control mechanism of each of the software processes of the group adjusts the respective data transfer rate $x(t)$ of each of the software processes of the group periodically, at an end of a period T as:

$$x(t+T) = x(t) + K(f(Q(t), Q_{max})α - x(t)q(t))$$

where x(t)q(t) is an amount of data injected into the virtual queue by each of the respective software processes of the group, K is some constant, α is the setpoint for x(t)q(t), $Q_{max}$ is the maximum virtual queue size, and $f(Q(t), Q_{max})$ is a setpoint adjustment function that is non-increasing with the amount of data in the virtual queue Q(t).

2. The system of claim 1 wherein the one or more network segments contain one or more communication links inside a network that are shared by traffic of the group of software processes as well as traffic from the one or more other software processes that are not included in the group.

3. The system of claim 1 wherein the virtual link controllers are incorporated into the group of software processes running on a single computer node.

4. The system of claim 1 wherein the virtual link controllers are incorporated into the group of software processes running on one or more distinct computer nodes sitting on a common local area network, or integrated together through a shared backplane.

5. The system of claim 1 wherein the one or more virtual queue parameters include a metric that is reflective of a difference between the amount of data present in the virtual queue Q(t) and a maximal virtual queue size $Q_{max}$.

6. The system of claim 5 wherein the metric reflective of the difference between Q(t) and $Q_{max}$ is relative occupancy of the virtual queue $Q(t)/Q_{max}$.

7. The system of claim 1 wherein the setpoint adjustment function $f(Q(t), Q_{max})$ is a non-increasing function of the relative occupancy $Q(t)/Q_{max}$, and has a form:

$$f(Q(t), Q_{max}) = [(1 - Q(t)/Q_{max})^+]^k$$

where k is some integer.

8. The system of claim 1 wherein the setpoint α and the setpoint adjustment function $f(Q(t), Q_{max})$ are specified such that a single process of the group of software processes will utilize all the bandwidth of the virtual link if no other process of the group of software processes is transferring data, and such that when multiple software processes of the group of software processes are present and transferring data maximally, each of the multiple software processes attain an equal share of the throughput capacity of the virtual link.

9. The system of claim 1 wherein the setpoint α and the setpoint adjustment function $f(Q(t), Q_{max})$ are specified such that the amount of data in the virtual queue Q(t) gradually approaches but never exceeds the maximal virtual queue size $Q_{max}$, when a number of the software processes in the group increases from 1 to infinity.

10. A method implemented by one or more computers, comprising:
executing a group of independent software processes that transfer data across one or more common segments inside a network in accordance with a specified protocol;
limiting, by a bandwidth limiting mechanism, an amount of bandwidth used by the group of software processes to transfer the data across the one or more common segments inside the network, thereby leaving an amount of residue bandwidth for use by one or more other software processes to transfer other data across the one or more common segments, the one or more other software processes not included in the group of software processes, the limiting comprising:
operating a respective virtual link controller incorporated into each of the software processes of the group that are independently executed by one or more computers, wherein the respective virtual link controllers determine an aggregate traffic rate of the data transferred by the group of software processes over the one or more common segments and implement a virtual link through which the software processes of the group are to be regarded as transferring their data;
wherein the virtual link is a software construct that emulates a physical link with a throughput capacity specified as a value $c_l$ representing a desired maximum bandwidth to be utilized by the group of software processes;
wherein the virtual link includes a virtual queue that is filled or emptied in accordance with whether the aggregate traffic rate is greater than or less than, respectively, the specified throughput capacity $c_l$, the virtual queue being a number representing an amount of data that would be queued in the physical link emulated by the virtual link;
wherein the virtual link controllers determine the aggregate traffic rate of data that is regarded to be passing through the virtual link from intermittent broadcasts sent by each respective one of the software processes of the group that signal to each other of the software processes of the group the amount of data transferred by the each respective one of the software processes of the group; and,
operating a respective rate control mechanism incorporated into each of the software processes that regulates a respective data transfer rate x(t) of each of the software processes of the group based upon one or more virtual queue parameters reflective of an extent to which the virtual queue is filled with data; and,
wherein:
the respective rate control mechanism of each of the software processes of the group is configured to adjust the respective data transfer rate of each of the software processes of the group utilizing a setpoint;
the setpoint is dynamically adjusted in accordance with the amount of data in the virtual queue so that the setpoint is increased as the amount of data in the virtual queue decreases and is decreased as the amount of data in the virtual queue increases;
the one or more virtual queue parameters include a virtual queuing delay q(t) calculated as $q(t) = Q(t)/c_l$, where Q(t) is the amount of data present in the virtual queue; and
the respective rate control mechanism of each of the software processes of the group adjusts the respective data transfer rate x(t) of each of the software processes of the group periodically, at an end of a period T as:

$$x(t+T) = x(t) + K(f(Q(t), Q_{max})\alpha - x(t)q(t))$$

where x(t)q(t) is an amount of data injected into the virtual queue by each of the respective software processes of the group, K is some constant, α is the setpoint for x(t)q(t), $Q_{max}$ is the maximum virtual queue size, and $f(Q(t), Q_{max})$ is a setpoint adjustment function that is non-increasing with the amount of data in the virtual queue Q(t).

11. The method of claim 10 wherein the one or more common segments contain one or more communication links inside a network that are shared by traffic of the group of software processes as well as traffic from the one or more other software processes that are not included in the group.

12. The method of claim 10 wherein the virtual link controllers are incorporated into the software processes of the group running on a single computer node.

13. The method of claim 10 wherein the virtual link controllers are incorporated into the software processes of the group running on one or more distinct computer nodes sitting on a common local area network, or integrated together through a shared backplane.

\* \* \* \* \*